US012613657B2

(12) United States Patent
Lee

(10) Patent No.: US 12,613,657 B2
(45) Date of Patent: Apr. 28, 2026

(54) CONTROLLER, STORAGE DEVICE AND METHOD FOR OPERATION TO BALANCE MEMORY DEGRADATION

(71) Applicant: SK hynix Inc., Icheon-si (KR)

(72) Inventor: Sung Min Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 63 days.

(21) Appl. No.: 18/447,204

(22) Filed: Aug. 9, 2023

(65) Prior Publication Data

US 2024/0192885 A1     Jun. 13, 2024

(30) Foreign Application Priority Data

Dec. 9, 2022     (KR) ........................ 10-2022-0171139

(51) Int. Cl.
G06F 3/06          (2006.01)
(52) U.S. Cl.
CPC .......... G06F 3/0658 (2013.01); G06F 3/0622 (2013.01); *G06F 3/0679* (2013.01)
(58) Field of Classification Search
CPC ..... G06F 3/0658; G06F 3/0622; G06F 3/0679

USPC ......................................................... 711/154
See application file for complete search history.

(56)                References Cited

U.S. PATENT DOCUMENTS

| | | | |
|---|---|---|---|
| 8,386,723 B2 * | 2/2013 | Bryant-Rich | G06F 12/06 |
| | | | 711/103 |
| 8,793,429 B1 * | 7/2014 | Call | G06F 12/0246 |
| | | | 711/170 |
| 2010/0318719 A1 * | 12/2010 | Keays | G06F 12/0246 |
| | | | 711/E12.001 |
| 2017/0003977 A1 * | 1/2017 | Sumida | G06F 9/50 |
| 2023/0062949 A1 * | 3/2023 | Guan | G06F 11/1448 |

FOREIGN PATENT DOCUMENTS

| | | | | |
|---|---|---|---|---|
| CN | 102819444 B | * | 9/2015 | |
| JP | 4279902 B2 | * | 6/2009 | G06F 9/4403 |
| KR | 10-2013-0004437 A | | 1/2013 | |
| KR | 10-2018-0067756 A | | 6/2018 | |
| TW | 200818013 A | * | 4/2008 | G06F 11/1417 |

* cited by examiner

*Primary Examiner* — Masud K Khan

(57)                ABSTRACT

In order to reduce the degradation deviation of each area of a volatile memory storing data related to the non-volatile memory included in a storage device, an area storing the corresponding data may be changed and set according to the type of data stored in the volatile memory at a preset time.

17 Claims, 7 Drawing Sheets

CONTROLLER, STORAGE DEVICE AND METHOD FOR OPERATION TO BALANCE MEMORY DEGRADATION

CROSS-REFERENCE TO RELATED APPLICATION

The present application claims priority under 35 U.S.C. § 119(a) to Korean patent application number 10-2022-0171139 filed in the Korean Intellectual Property Office on Dec. 9, 2022, which is incorporated herein by reference in its entirety.

TECHNICAL FIELD

The embodiments of the present disclosure relate to a controller, a storage device and an operating method thereof capable of reducing degradation of memory.

BACKGROUND

A storage device may include, for example, a non-volatile memory including a plurality of memory cells and a controller controlling the non-volatile memory.

In some cases, a storage device may include a volatile memory for storing data necessary for the controller to control the non-volatile memory. This volatile memory may be located inside the controller or outside the controller.

As the driving time of the storage device increases, the volatile memory included in the storage device may deteriorate. As the deterioration of the volatile memory progresses, the performance of the volatile memory may degrade and the life of the volatile memory may decrease. The performance of the non-volatile memory included in the storage device may deteriorate and the storage device may fail due to the degradation of the volatile memory.

SUMMARY

Embodiments of the disclosure provide a configuration capable of reducing the deviation in the degradation of areas of volatile memory included in a storage device, improving performance and reducing occurrence of defects due to degradation of volatile memory.

In one aspect, embodiments of the present disclosure may provide a storage device including a non-volatile memory, a volatile memory including a plurality of areas in which a plurality of types of information associated with the non-volatile memory are stored, and a controller configured to select at least one area of the plurality of areas based on a type of information stored in each of the plurality of areas, and to change and allocate at least a portion of the selected area at a specific time.

In another aspect, embodiments of the present disclosure may provide an operating method of a storage device including checking an existing area allocated as an area for storing a first type of information associated with an externally located memory upon booting, allocating a first use area for storing the first type of information by changing at least a portion of the existing area, and allocating at least a portion of an area other than the first use area as a second use area for storing a second type of information associated with the externally located memory.

In another aspect, embodiments of the present disclosure may provide a controller including a first processing module configured to process data stored in a first memory, and a second processing module configured to perform processing relating to data stored in a second memory storing information associated with the first memory, and to change and allocate an area storing map data related to data stored in the first memory, from among a plurality of areas included in the second memory, at every booting.

According to embodiments of the present disclosure, it is possible to minimize the differences in degradation among a plurality of areas of a volatile memory included in a storage device and used for an operation of a non-volatile memory, thereby improving the performance of volatile memory and lowering occurrence of defects in a storage device.

DETAILED DESCRIPTION

Figure 1:
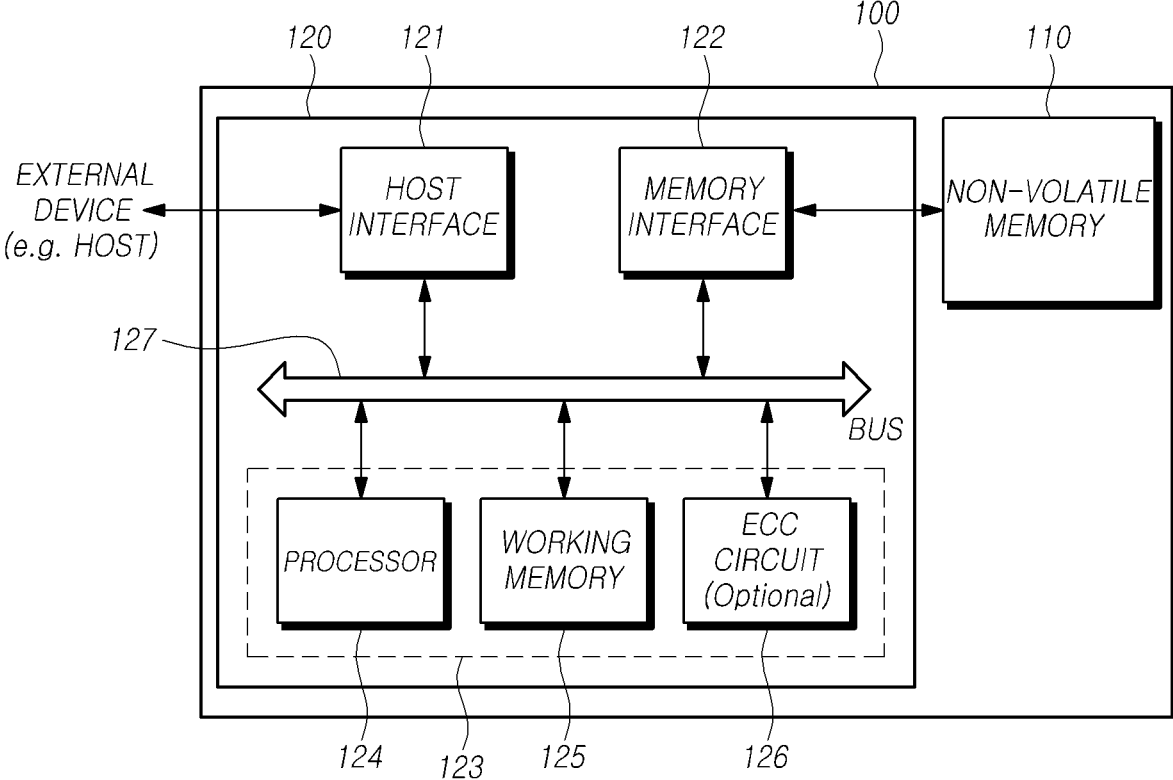
FIG. 1 is a schematic diagram illustrating a configuration of a storage device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting", "made up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps", etc., a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for elements or features, or corresponding information (e.g., level, range, etc.) include a tolerance or error range that may be caused by various factors (e.g., process factors, internal or external impact, noise, etc.) even when a relevant description is not specified. Further, the term "may" fully encompass all the meanings of the term "can".

Hereinafter, various embodiments of the present disclosure will be described in detail with reference to accompanying drawings.

FIG. 1 is a schematic diagram illustrating a configuration of a storage device according to embodiments of the present disclosure.

Referring to FIG. 1, a storage device 100 may include a non-volatile memory 110 for storing data, and a controller 120 for controlling the non-volatile memory 110.

The non-volatile memory 110 may include a plurality of memory blocks and may operate in response to control of the controller 120. An operation of the non-volatile memory 110 may include, for example, a read operation, a program operation (also referred to as a "write operation"), and an erase operation.

The non-volatile memory 110 may include a memory cell array including a plurality of memory cells (also referred to simply as "cells") storing data. Such a memory cell array may exist in a memory block.

For example, the non-volatile memory 110 may be implemented in a variety of types of memory, such as a NAND flash memory, a 3D NAND flash memory, a NORA flash memory, a resistive RAM, a phase change memory, a magneto-resistive memory, a ferroelectric memory, or a spin injection magnetization inversion memory.

The non-volatile memory 110 may be implemented in a three-dimensional array structure. Embodiments of the present disclosure may be applied not only to a flash memory in which a charge storage layer is composed of a conductive floating gate, but also to a flash memory of a charge trap type (CTF) in which a charge storage layer is composed of an insulating film.

The non-volatile memory 110 may receive a command and an address from the controller 120 and access an area selected by the address in the memory cell array. The non-volatile memory 110 may perform an operation indicated by a command on an area selected by an address.

For example, the non-volatile memory 110 may perform a program operation, a read operation, and an erase operation.

When performing a program operation, the non-volatile memory 110 may program data in an area selected by an address. When performing a read operation, the non-volatile memory 110 may read data from an area selected by an address. When performing the erase operation, the non-volatile memory 110 may erase data stored in an area selected by an address.

The controller 120 may control write (program), read, erase, and background operations of the non-volatile memory 110. The background operations may include, for example, one or more of garbage collection (GC), wear leveling (WL), read reclaim (RR), or bad block management (BBM) operations.

The controller 120 may control the operation of the non-volatile memory 110 according to a request of a device (e.g., a host HOST) located outside the storage device 100. In addition, the controller 120 may control the operation of the non-volatile memory 110 regardless of a request from the host HOST.

The host may be a computer, UMPC (Ultra Mobile PC), workstation, PDA (Personal Digital Assistants), tablet, mobile phone, smartphone, e-book, PMP (Portable Multimedia Player), portable game device, a navigation device, a black box, a digital camera, a DMB (Digital Multimedia Broadcasting) players, smart televisions, digital voice recorders, digital voice players, digital video recorders, digital video players, digital video recorders, digital video players, storage constituting data centers, one of various electronic devices constituting a home network, one of various electronic devices constituting a computer network, one of various electronic devices constituting a telematics network, an RFID (Radio Frequency IDentification) device, and a mobile device (e.g., a vehicle, a robot, a drone) capable of driving under human control or autonomous driving.

The host may include at least one operating system. The operating system may manage and control overall functions and operations of the host and provide mutual operations between the host and the storage device 100. The operating system may be divided into a general operating system and a mobile operating system depending on the mobility of the host.

The controller 120 and the host may be separate devices. In some cases, the controller 120 and the host may be implemented as an integrated device. In the following, for convenience of explanation, it will be described an example in which the controller 120 and the host are separate devices.

Referring to FIG. 1, the controller 120 may include a memory interface 122, a control circuit 123, and the like, and may further include a host interface 121.

The host interface 121 provides an interface for communication with the host. For example, the host interface 121 may provide an interface using at least one of an universal serial bus (USB) protocol, a multimedia card (MMC) protocol, a peripheral component interconnection (PCI) protocol, a PCI-express (PCI-E) protocol, and an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a system management bus (SMBus) protocol, an inter-integrated circuit (I2C) protocol, an improved inter-integrated circuit (I3C) protocol, and a private protocol.

When receiving a command from the host, the control circuit 123 may receive the command through the host interface 121 and perform an operation of processing the received command.

The memory interface 122 may be connected to the non-volatile memory 110 to provide an interface for communication with the non-volatile memory 110. The memory interface 122 may be configured to provide an interface between the non-volatile memory 110 and the controller 120 in response to control of the control circuit 123.

The control circuit 123 may control the operation of the non-volatile memory 110 by performing overall control operations of the controller 120. For example, the control circuit 123 may include one or more of a processor 124, a working memory 125, and the like, and may optionally include an error detection and correction circuit (ECC Circuit, 126) and the like.

The processor 124 may control overall operations of the controller 120 and perform logical operations. The processor 124 may communicate with the host through the host interface 121 and may communicate with the non-volatile memory 110 through the memory interface 122.

The processor 124 may perform a function of a flash translation layer (FTL). The processor 124 may convert a logical block address (LBA) provided by the host into a physical block address (PBA) through a flash translation layer (FTL). The flash translation layer (FTL) may receive a logical block address (LBA) by using a mapping table and convert it into a physical block address (PBA).

There are various methods of address mapping of the flash translation layer according to mapping units. The address mapping methods may include a page mapping method, a block mapping method, and a mixed mapping method.

The processor 124 may randomize data received from the host. For example, the processor 124 may randomize data received from the host using a set randomizing seed. The randomized data may be provided to the non-volatile memory 110 and programmed into a memory cell array of the non-volatile memory 110.

The processor 124 may derandomize data received from the non-volatile memory 110 during a read operation. For example, the processor 124 may derandomize data received from the non-volatile memory 110 using the derandomizing seed. The derandomized data may be output to the host.

The processor 124 may control the operation of the controller 120 by executing firmware. The processor 124 may execute (drive) firmware loaded into the working memory 125 during booting in order to control the overall operation of the controller 120 and perform logical operations. Hereinafter, an operation of the storage device 100 described in embodiments of the present disclosure may be implemented in a manner in which the processor 124 executes firmware defining corresponding operations.

The firmware may be a program executed in the storage device 100 to drive the storage device 100, and may include various functional layers. For example, the firmware may include binary data defining codes for executing each of the aforementioned functional layers.

For example, the firmware may include at least one of a flash translation layer (FTL) for performing a conversion function between a logical address requested by the host to the storage device 100 and a physical address of the non-volatile memory 110; a host interface layer (HIL) for interpreting a command requested by the host to the storage device 100 and delivering it to a flash translation layer (FTL); and a flash interface layer (FIL) for transferring commands instructed by the flash translation layer (FTL) to the non-volatile memory 110.

Such firmware, for example, may be loaded into the working memory 125 from the non-volatile memory 110 or from a separate non-volatile memory (e.g., ROM, NOR Flash) located outside the non-volatile memory 110. When executing a booting operation after power-on, the processor 124 may first load all or part of the firmware into the working memory 125.

The processor 124 may perform logic operations defined in firmware loaded in the working memory 125 to control the overall operation of the controller 120. The processor 124 may store a result of performing a logic operation defined in firmware in the working memory 125. The processor 124 may control the controller 120 to generate a command or signal according to a result of performing a logic operation defined in firmware. If the part of the firmware defining the logic operation to be performed is not loaded in the working memory 125, then an event may be generated (e.g., interrupt) for loading the corresponding part of the firmware into the working memory 125.

Meanwhile, the processor 124 may load meta data necessary for driving the firmware from the non-volatile memory 110. Meta data is data for managing the non-volatile memory 110 and may include management information about user data stored in the non-volatile memory 110.

The firmware may be updated while the storage device 100 is being produced or while the storage device 100 is running. The controller 120 may download new firmware from the outside of the storage device 100 and update the existing firmware to the new firmware.

The working memory 125 may store firmware, program codes, commands, or data required to operate the controller 120. The working memory 125, as a volatile memory, may include, for example, one or more of static RAM (SRAM), dynamic RAM (DRAM), and synchronous DRAM (SDRAM).

The error detection and correction circuit 126 may detect an error bit of target data using an error correction code and correct the detected error bit. The target data may be, for example, data stored in the working memory 125 or data read from the non-volatile memory 110.

The error detection and correction circuit 126 may be implemented to decode data with an error correction code. The error detection and correction circuit 126 may be implemented with a variety of code decoders. For example, a decoder performing non-systematic code decoding or a decoder performing systematic code decoding may be used.

For example, the error detection and correction circuit 126 may detect an error bit in units of sectors set for each of the read data. Each read data may be composed of a plurality of sectors. A sector may refer to a data unit smaller than a page, which is a read unit of a flash memory. Sectors constituting each read data may correspond to each other by using an address.

The error detection and correction circuit 126 may calculate a bit error rate (BER) and determine the possibility of correction in units of sectors. For example, the error detection and correction circuit 126 may determine that the corresponding sector is uncorrectable or failed if the bit error rate is higher than a set reference value. On the other hand, if the bit error rate is lower than the reference value, then the corresponding sector may be determined to be correctable or pass.

The error detection and correction circuit 126 may sequentially perform error detection and correction operations on all read data. If a sector included in read data is correctable, then the error detection and correction circuit 126 may skip an error detection and correction operation for a corresponding sector for next read data. If the error detection and correction operations for all read data are completed in this way, then the error detection and correction circuit 126 may detect sectors determined to be uncorrectable until the end. The number of sectors determined to be uncorrectable may be one or more. The error detection and correction circuit 126 may transfer information (e.g., address information) on a sector determined to be uncorrectable to the processor 124.

A bus 127 may be configured to provide a channel between components 121, 122, 124, 125, and 126 of controller 120. The bus 127 may include, for example, a control bus for transferring various control signals, commands, and the like, and a data bus for transferring various data.

Meanwhile, some of the above-described components 121, 122, 124, 125, and 126 of the controller 120 may be deleted, or some of the above-described components 121, 122, 124, 125 and 126 may be integrated into one element. In some cases, one or more other components may be added in addition to the above-described components of the controller 120.

Figure 2:
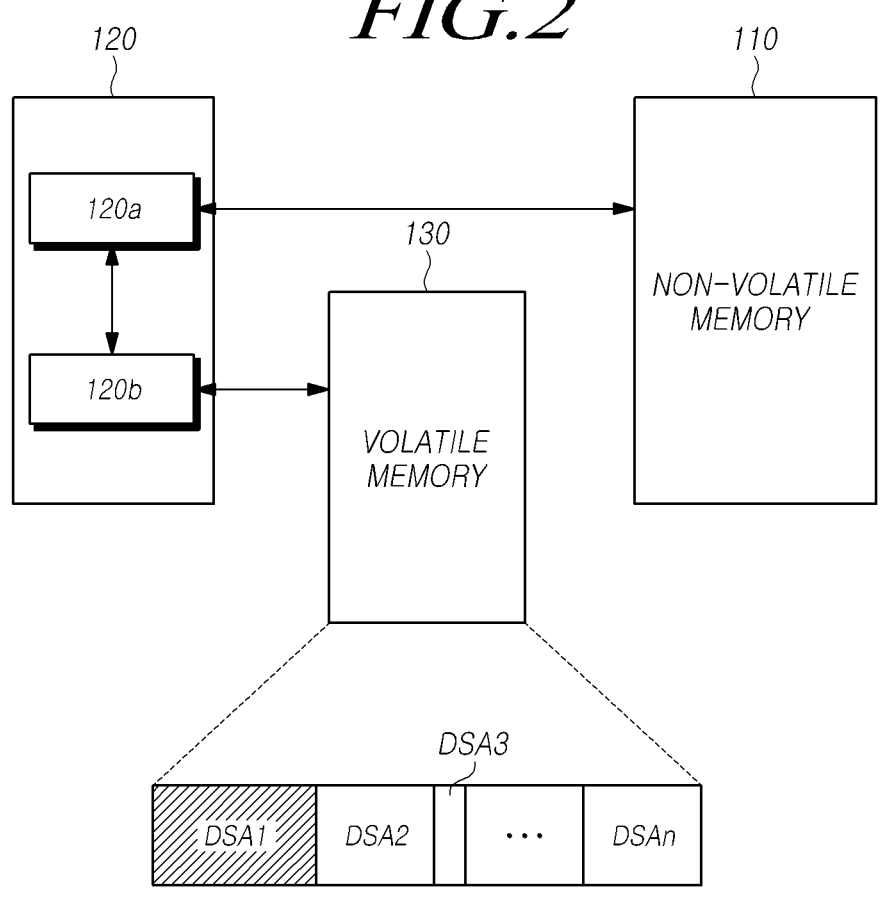
FIG. 2 illustrates an example of a structure of a storage device including a volatile memory according to embodiments of the present disclosure.

FIG. 2 illustrates an example of a structure of a storage device including a volatile memory according to embodiments of the present disclosure.

Referring to FIG. 2, a storage device 100 may include a non-volatile memory 110, a controller 120 and a volatile memory 130.

The controller 120 may include, for example, a first processing module 120a and a second processing module 120b. The first processing module 120a may control the operation of the non-volatile memory 110. The second processing module 120b may control the operation of the volatile memory 130.

The first processing module 120a and the second processing module 120b may be a processor 124 included in the controller 120. The first processing module 120a and the second processing module 120b may be physically separated components, or may refer to functionally separated components in a single configuration.

The volatile memory 130 may be, for example, a working memory 125 located inside the controller 120 described above.

Alternatively, the volatile memory 130 may be a memory separately disposed outside the controller 120. Data necessary for the operation of the non-volatile memory 110 may be stored using the volatile memory 130 located outside the controller 120.

A plurality of types of information associated with the non-volatile memory 110 may be stored in the volatile memory 130.

Alternatively, a plurality of types of information associated with data stored in the non-volatile memory 110 may be stored in the volatile memory 130.

For example, map data related to data stored in the non-volatile memory 110 may be stored in the volatile memory 130. In addition, valid page bitmap information, read count information, trim bitmap information, defect journal information, and the like may be stored in the volatile memory 130.

There may be allocated a plurality of areas of volatile memory 130 to store the plurality of types of information associated with non-volatile memory 110. For example, the volatile memory 130 may include n data storage areas DSA1, DSA2, DSA3, . . . , DSAn. In this specification, a data storage area may be also expressed as a use area.

The size of the n data storage areas DSA1, DSA2, DSA3, . . . , DSAn may be set differently according to the type of data stored in each data storage area DSA.

For example, among n data storage areas DSA1, DSA2, DSA3, . . . , DSAn, the size of a data storage area DSA for storing map data that is related to data stored in the non-volatile memory 110 may be the largest. In other cases, however, the type of data stored in the data storage area DSA with the largest size may be different.

In the volatile memory 130, data storage areas DSA storing a plurality of types of data may be allocated to a fixed area. Alternatively, in the volatile memory 130, an area allocated to the data storage area DSA storing a plurality of types of data may be dynamically set.

Figure 3:
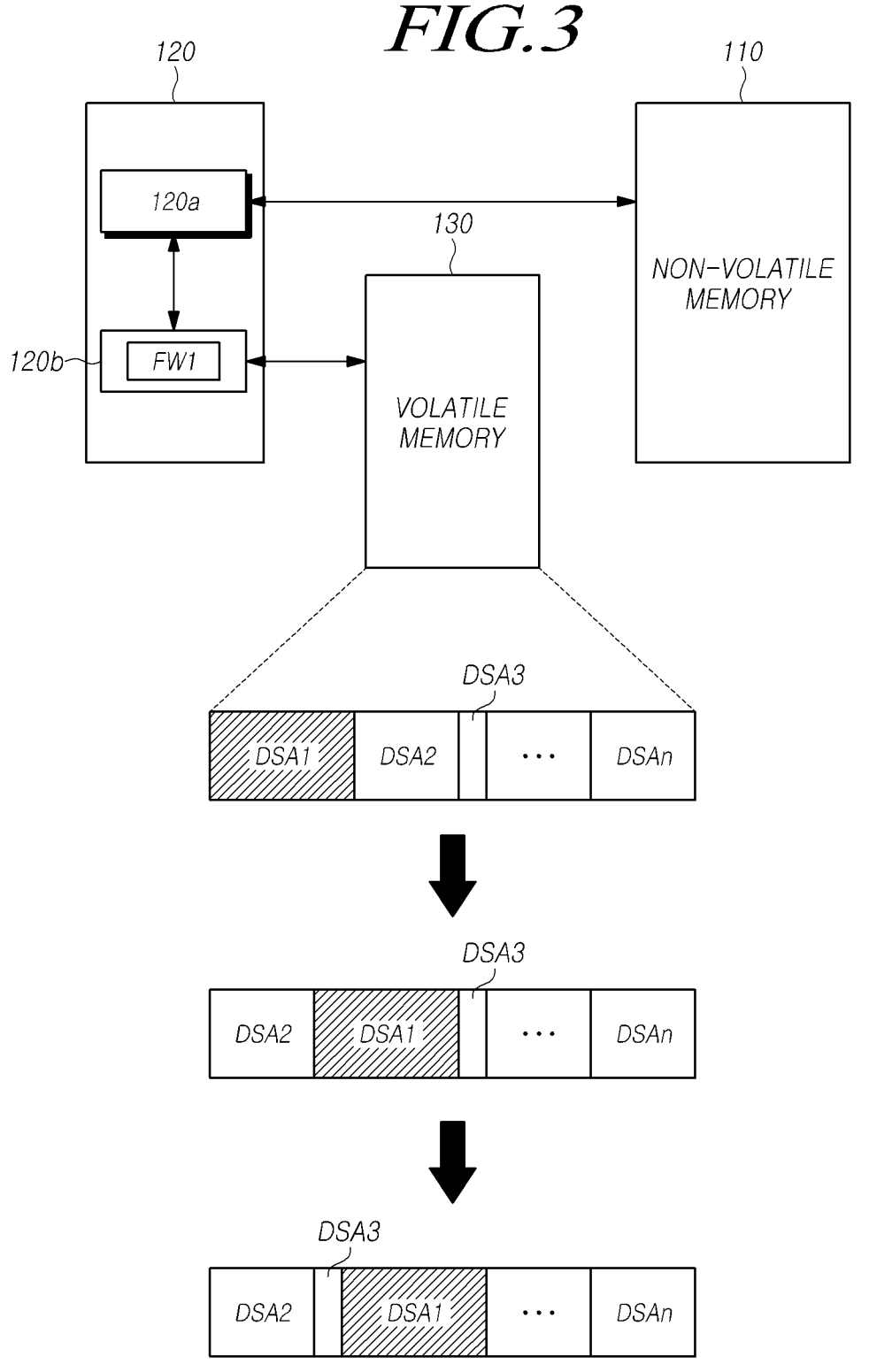
FIG. 3 illustrates an example of a method of changing a data storage area of a volatile memory included in a storage device according to embodiments of the present disclosure.
Figure 4:
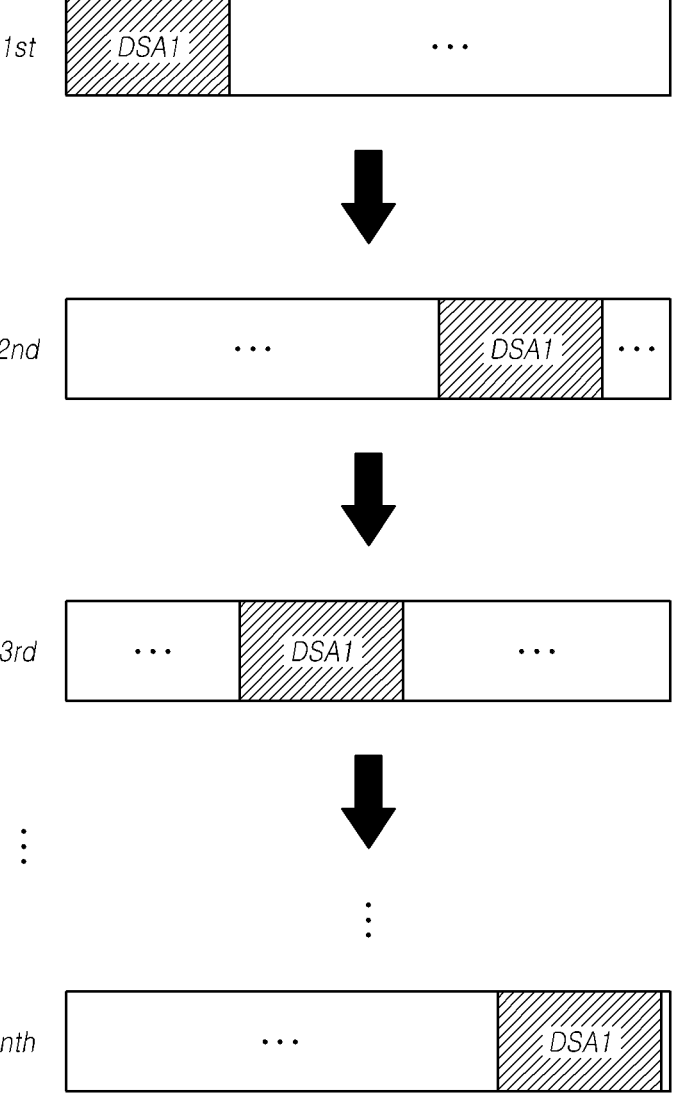
FIGS. 4 and 5 illustrate other examples of a method of changing a data storage area of a volatile memory included in a storage device according to embodiments of the present disclosure.
Figure 5:
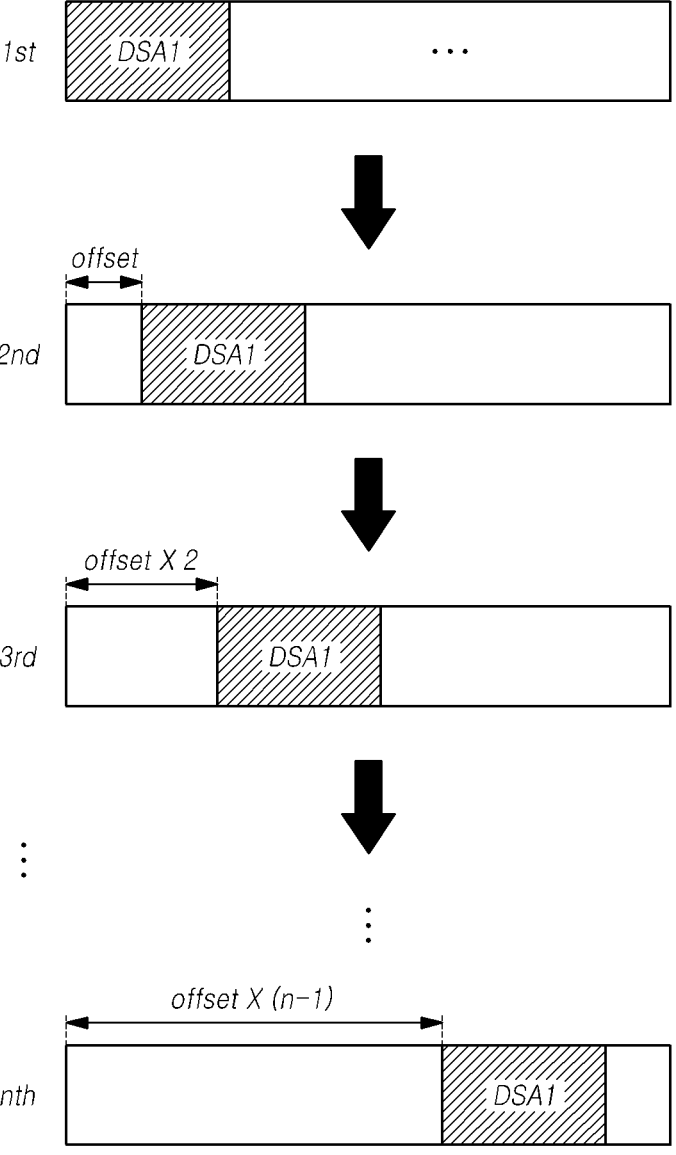

FIG. 3 illustrates an example of a method of changing a data storage area of a volatile memory included in a storage device 100 according to embodiments of the present disclosure. FIGS. 4 and 5 illustrate other examples of a method of changing a data storage area of a volatile memory included in a storage device according to embodiments of the present disclosure.

Referring to FIG. 3, at least some of a plurality of data storage areas DSA included in a volatile memory 130 may be variably set.

For example, all of a plurality of data storage areas DSA may be altered and set at a preset specific time. Alternatively, one or more specific data storage areas DSA from among a plurality of data storage areas DSA may be changed and set at a preset time.

The entire data storage area DSA that is changed and allocated may be set to another area, or a part of the data storage area DSA may be set to another area.

For example, upon booting of the storage device 100, an area to which the plurality of data storage areas DSA included in the volatile memory 130 are allocated may be changed and set.

When booting the storage device 100, a first firmware FW1 may be loaded into the second processing module 120b. The second processing module 120b may variably set an area to which the data storage area DSA included in the volatile memory 130 is allocated by using the first firmware FW1.

The second processing module 120b may, for example, select a data storage area DSA to change an allocated area from among a plurality of data storage areas DSA.

For example, the second processing module 120b may change and select an area having the largest size, from among the plurality of data storage areas DSA, as an area to be allocated.

Alternatively, the second processing module 120b may change and select an area having the highest access frequency during a driving period, from among the plurality of data storage areas DSA, as an area to be allocated.

Alternatively, the second processing module 120b may change and select an area having the highest degradation level, from among the previously set data storage area DSA, in the volatile memory 130 as an area to be allocated.

In addition, the data storage area DSA is selected in various ways by the second processing module 120b when changing the allocation area.

For example, the second processing module 120b may variably allocate and set at least a portion of an area for storing map data related to data stored in the volatile memory 110, from among a plurality of data storage areas DSA included in the volatile memory 130.

In an exemplar, FIG. 3 illustrates variable allocation and setting of a first data storage area DSA1 among a plurality of data storage areas DSA.

The second processing module 120b may variably set the first data storage area DSA1 according to the first firmware FW1.

The second processing module 120b, for example, may change and allocate the location of the first data storage area DSA1 at every booting.

Alternatively, the second processing module 120b may check a cumulative operating time of the storage device 100 during booting.

The second processing module 120b may check the cumulative operating time of the storage device 100, and change and allocate a location of the first data storage area DSA1 if the cumulative operating time is equal to or greater than a preset threshold value.

In addition, the second processing module 120b may change and allocate the first data storage area DSA1, and change and allocate at least some of the remaining data storage areas DSA. In some cases, some of the data storage areas DSA may be allocated in a fixed state without being changed.

The second processing module 120b may change and allocate the first data storage area DSA1 by replacing the first data storage area DSA1 with another data storage area DSA.

For example, as in the example shown in FIG. 3, the second processing module 120b may perform an allocation in which the first data storage area DSA1 is replaced with the second data storage area DSA2. If booting is performed again thereafter, the second processing module 120b may replace and allocate the first data storage area DSA1 with the third data storage area DSA3.

The first data storage area DSA1 may be sequentially replaced with other data storage areas DSA and allocated. Since the first data storage area DSA1, which has the highest access frequency, is changed and allocated at every booting or every time a specific cumulative operating period accrues, the first data storage area DSA1 does not degrade more severely than other data storage areas DSA. Therefore, it is possible to reduce the deviation in the degree of degradation among the plurality of data storage areas DSA included in the volatile memory 130.

There may be various methods of changing an area to which the first data storage area DSA1 is allocated.

For example, referring to FIG. 4, a second processing module 120b may randomly set an area to which a first data storage area DSA1 is allocated at every booting. Alternatively, the second processing module 120b may randomly set an area to which the first data storage area DSA1 is allocated if the cumulative operating time exceeds a preset threshold value upon booting.

If the first data storage area DSA1 is randomly set at every booting, then the first data storage area DSA1 may be set so as not to overlap with a previously set area.

Alternatively, the first data storage area DSA1 may be set to overlap a portion of a previously set area. The second processing module 120b may set an area in which the size of the portion overlapping the previously set area of the first data storage area DSA1 can be minimized.

Since the first data storage area DSA1 is variably set at each predetermined time, such as at booting, the areas in which the level of degradation increases in the volatile memory 130 may be more evenly dispersed or distributed. Therefore, it is possible to prevent the degree of deviation in degrading among the plurality of data storage areas DSA included in the volatile memory 130 from increasing.

Alternatively, the second processing module 120b may change and set the area to which the first data storage area DSA1 is allocated according to a predetermined pattern at predetermined times.

For example, referring to FIG. 5, a second processing module 120b may shift and allocate at least some data storage areas DSA, from among a plurality of data storage areas DSA allocated to the volatile memory 130, at a preset time that is a multiple of a preset offset.

The second processing module 120b may allocate the first data storage area DSA1 by shifting by a preset offset whenever booting or when the cumulative operating time exceeds a preset threshold value.

The preset offset, for example, may be greater than a size of a data storage area DSA that is changed and allocated.

Alternatively, the preset offset may be smaller than the size of the changed and allocated data storage area DSA. In this case, the preset offset may be set to a value capable of minimizing an overlapping portion between the newly allocated first data storage area DSA1 and the previously allocated first data storage area DSA1.

Since an area allocated as the first data storage area DSA1 is shifted and allocated by a predetermined offset at each preset specific time, such as at booting, there may be alleviated a problem in which the level of degradation increases compared to other data storage areas DSA due to the allocation as the first data storage area DSA1. Therefore, it is possible to prevent the degrading deviation, among the plurality of data storage areas DSA included in the volatile memory 130, from increasing.

In addition, when newly allocating the first data storage area DSA1, the second processing module 120b may check the degradation level of each area included in the volatile memory 130 and preferentially allocate the first data storage area DSA1 to an area having a low level of degradation.

Figure 6:
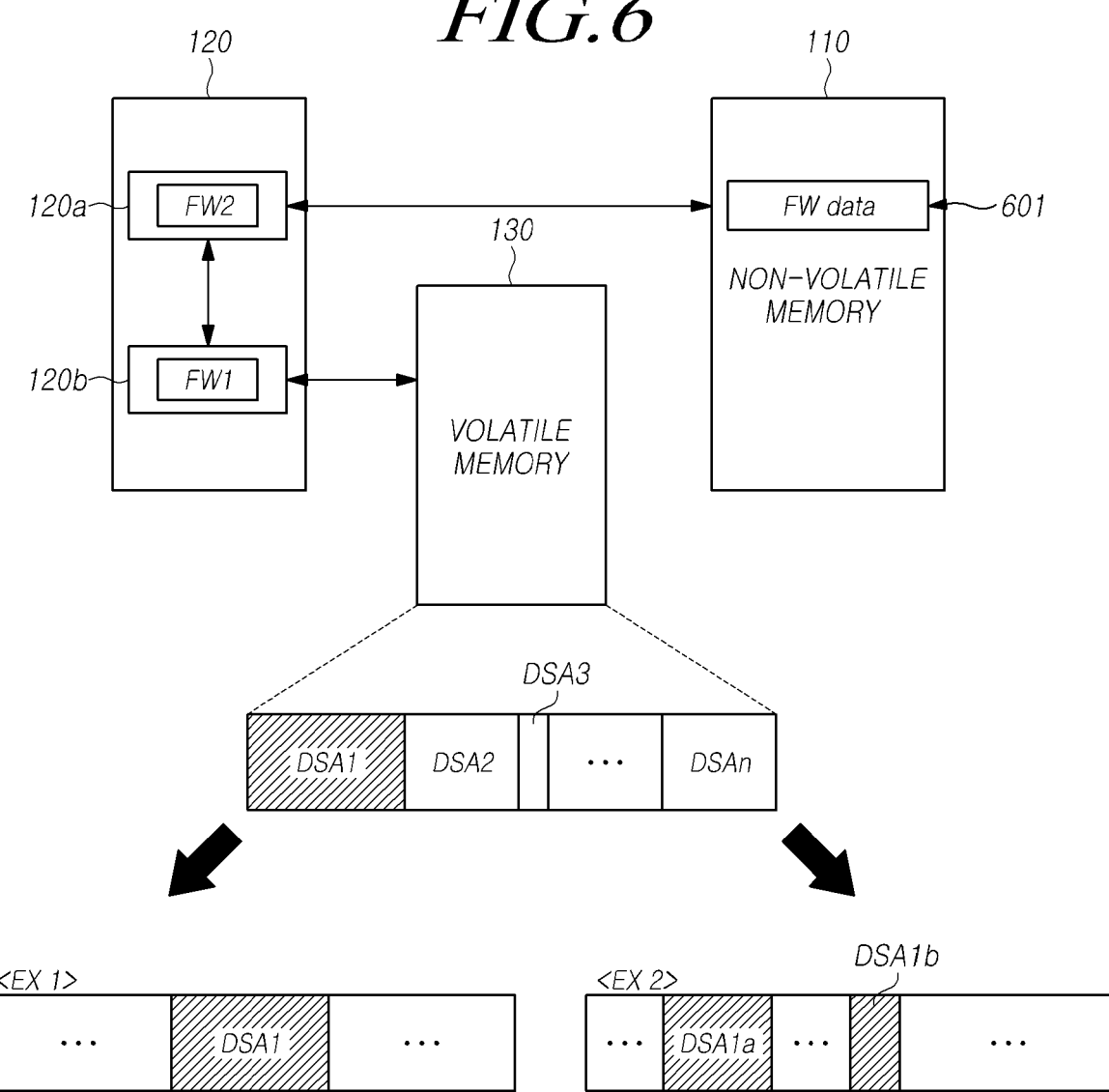
FIG. 6 illustrates another example of a method of changing a data storage area of a volatile memory included in a storage device according to embodiments of the present disclosure.

FIG. 6 illustrates another example of a method of changing a data storage area DSA of a volatile memory included in a storage device according to embodiments of the present disclosure.

Referring to FIG. 6, for example, when booting, a first firmware FW1 for changing and setting the area to which the data storage area DSA of a volatile memory 130 is allocated may be loaded into a second processing module 120b.

In addition, a second firmware FW2 for loading data about the degradation level of each area of the volatile memory 130 may be loaded into the first processing module 120a. In some cases, the first firmware FW1 and the second firmware FW2 may be composed of one firmware or may be loaded in the same processing module.

As shown in 601 of FIG. 6, the first processing module 120a may read, by using the second firmware FW2, data about the degradation level of each area of the volatile memory 130 from the area storing the firmware data FW data of a non-volatile memory 110.

The first processing module 120a may provide information about the degradation level of each area of the volatile memory 130 to the second processing module 120b.

The second processing module 120b may select an area to be allocated by changing the first data storage area DSA1, among the areas of the volatile memory 130, based on the information on the degradation level of each area of the volatile memory 130 that is provided from the first processing module 120a.

For example, the second processing module 120b may allocate the first data storage area DSA1 such that the first data storage area DSA1 includes an area with the lowest degradation level among areas of the volatile memory 130. As in <EX 1>, the first data storage area DSA1 may be changed and allocated, and the area newly allocated as the first data storage area DSA1 may include an area with the lowest degradation level of the volatile memory 130.

In some cases, the first data storage area DSA1 may be selected and allocated as an area capable of minimizing an overall sum of degradation levels of areas allocated to the first data storage area DSA1.

In other cases, in order to minimize the degradation levels of the area allocated to the first data storage area DSA1, in the process of changing and allocating the first data storage area DSA1, two or more subareas may be divided and allocated.

For example, as in the example shown in <EX 2>, in the process of newly changing and allocating the first data storage area DSA1 in the volatile memory 130, the first data storage area DSA1 may be divided into a first portion DSA1a and a second portion DSA1b so as to be allocated. If necessary, the first data storage area DSA1 may be divided into two or more portions and allocated so that the value of the degradation level of the area allocated as the first data storage area DSA1 is minimized.

Figure 7:
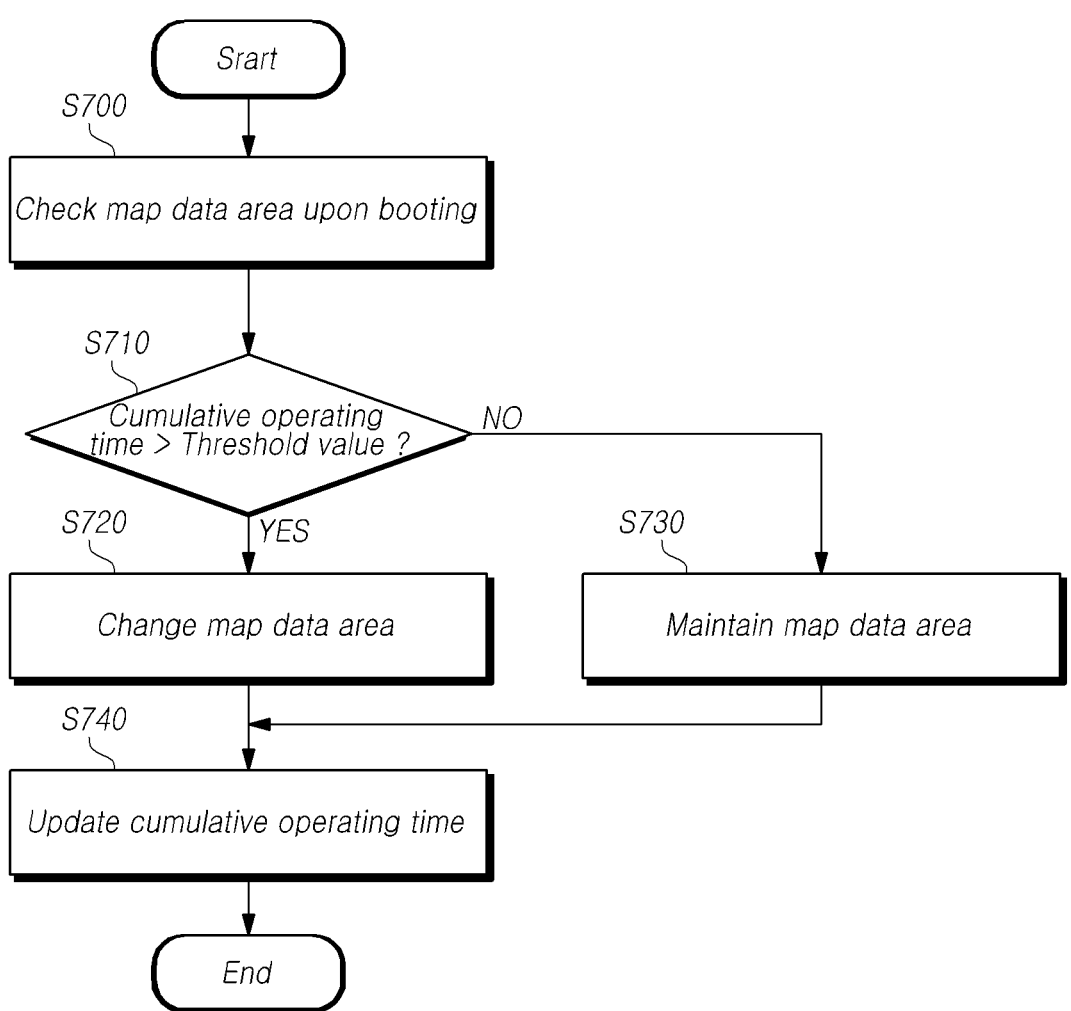
FIG. 7 is a flowchart illustrating an example of an operating method of a storage device according to embodiments of the present disclosure.

FIG. 7 is a flowchart illustrating an example of an operating method of a storage device according to embodiments of the present disclosure.

Referring to FIG. 7, a controller 120 of a storage device 100 may check an area storing map data in a volatile memory 130 upon booting (S700).

The controller 120 may check whether the cumulative operating time is greater than a predetermined threshold value (S710). The controller 120 may change and allocate the previously allocated map data area if the cumulative operating time is greater than a preset threshold value (S720). In other embodiments, the controller 120 may change and allocate the map data area every booting.

The controller 120 may change and allocate the entire previously allocated map data area or may change and allocate a part of the map data area. The controller 120 may allocate the map data area randomly or may allocate the map data area by shifting by a preset offset. In some cases, the controller 120 may allocate a map data area starting from an area with a low degradation level based on information about the degradation level of each area of the volatile memory 130.

The controller 120 may maintain the existing map data area if the cumulative operating time is greater than the threshold value (S730).

The controller 120 may change and allocate the map data area storing map data in the volatile memory 130 at every booting. Alternatively, the controller may change the map data storage area when a predetermined operating time elapses, based on the cumulative operating time, thereby reducing cases in which the map data storage area is unnecessarily changed and set.

The controller 120 may continuously update the cumulative operating time (S740).

The controller 120 may variably set an area storing the map data at a preset time based on the cumulative operating time, thereby preventing an increase in the difference between the degradation level of the map data area and the degradation level of other areas.

According to embodiments of the present disclosure, it is possible reduce the degradation deviation between data storage areas DSA in the volatile memory 130. Accordingly, it is possible to prevent performance degradation and defect occurrences from an increase in degradation deviation between the data storage areas DSA of the volatile memory 130.

Based on embodiments of the disclosed technology described above, operational delay time of the memory system may be advantageously reduced or minimized. In addition, based on an embodiment of the disclosed technology, overhead occurring in the process of calling a specific function may be advantageously reduced or minimized. Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims.

What is claimed is:

1. A storage device comprising:
   a non-volatile memory;
   a volatile memory including a plurality of areas in which a plurality of types of information associated with the non-volatile memory are stored; and
   a controller configured to select at least one area of the plurality of areas based on a type of information stored in each of the plurality of areas, and to change and allocate at least a portion of the selected area at a specific time,
   wherein the selected area stores one of type of information from among the plurality of types of information, and a location of the selected area in the volatile memory at a first specific time is different from a location of the selected area in the volatile memory at a second specific time, and
   wherein the controller is configured to allocate a first area included in the volatile memory at the first specific time for loading the one of type of information from the non-volatile memory, allocate a second area included in the volatile memory at the second specific time for loading the one of type of information from the non-volatile memory, and at least a part of the second area is different from the first area.

2. The storage device of claim 1, wherein the controller changes and allocates at least a portion of the selected area, from among the plurality of areas, upon booting.

3. The storage device of claim 1, wherein the controller checks a cumulative operating time upon booting, and changes and allocates at least a portion of the selected area, from among the plurality of areas, if the cumulative operating time is greater than or equal to a preset threshold value.

4. The storage device of claim 1, wherein the controller randomly allocates the selected area from among the plurality of areas.

5. The storage device of claim 1, wherein the controller shifts and allocates the selected area, from among the plurality of areas, by a specific offset.

6. The storage device of claim 1, wherein the controller changes and allocates the selected area, from among the plurality of areas, to at least one area from among the plurality of areas other than the selected area.

7. The storage device of claim 1, wherein the controller changes and allocates the selected area, from among the plurality of areas, to include an area having the lowest degradation level among the plurality of areas.

8. The storage device of claim 1, wherein the selected area of the plurality of areas is an area in which map data related to data stored in the non-volatile memory is stored.

9. The storage device of claim 1, wherein the selected area of the plurality of areas is an area with the highest access frequency during a specific time period.

10. The storage device of claim 1, wherein the selected area of the plurality of areas is an area having the largest size from among the plurality of areas.

11. An operating method of a storage device comprising:
checking an existing area of a volatile memory allocated
as an area for storing a first type of information
associated with data stored in a non-volatile memory
upon booting;
allocating a first use area of the volatile memory for
storing the first type of information by changing at least
a portion of the existing area; and
allocating at least a portion of an area other than the first
use area as a second use area of the volatile memory for
storing a second type of information associated with
data stored in the non-volatile memory,
wherein a location of the first use area in the volatile
memory at a first timing is different from a location of
the first use area in the volatile memory at a second
timing, and
wherein a first area of the volatile memory is allocated for
the first use area at the first timing, a second area of the
volatile memory is allocated for the first use area at the
second timing, and at least a part of the second area is
different from the first area.

12. The operating method of claim 11, wherein at least a
portion of the first use area is changed every booting.

13. The operating method of claim 11, wherein the
information stored in the first use area is map data related to
data stored in the non-volatile memory.

14. The operating method of claim 11, wherein an access
frequency of the first use area is greater than an access
frequency of the second use area.

15. The operating method of claim 11, wherein a size of
the first use area is greater than a size of the second use area.

16. A controller comprising:
a first processing module configured to process data
stored in a first memory; and
a second processing module configured to perform pro-
cessing relating to data stored in a second memory
storing information associated with the first memory,
and to change and allocate an area storing map data
related to data stored in the first memory, from among
a plurality of areas included in the second memory, at
every booting,
wherein a location of the area storing the map data in the
second memory at a first timing is different from a
location of the area storing the map data in the second
memory at a second timing, and
wherein a first area of the second memory is allocated for
storing the map data, a second area of the second
memory is allocated for storing the map data, and at
least a part of the second area is different from the first
area.

17. The controller of claim 16, wherein the second pro-
cessing module checks a cumulative operating time during
which each of the plurality of areas is allocated as an area
storing the map data, and allocates as an area for storing the
map data starting with an area having a smaller cumulative
operating time.

* * * * *